Patented Aug. 7, 1934

1,969,292

UNITED STATES PATENT OFFICE 1,969,292

HARDENED RESIN

Erich Asser, Wandsbek, Germany

No Drawing. Application December 17, 1931, Serial No. 581,769. In Germany December 17, 1930

2 Claims. (Cl. 260—4)

The method of raising the melting point of natural acid-resins by melting together hardenable synthetic resins of the phenol-formaldehyde type (resols) with natural acid-resins and resin-acids is already well known. The melting point of the latter may be raised at will to whatever degree desired, the final degree depending upon the quantity of the condensation product of phenols or cresols and formaldehyde proportionately used.

These condensation products react only with natural acid resins. If they are reacted with resin-ester resins, it is found that these condensation-products separate out after a certain time of heating, and if the heating is continued they remain insoluble in the melted mixture. An absolute or perfect mixing of the two materials does not take place.

It is indeed possible to melt together soluble and permanently fusible synthetic resins (so-called novalak) in any proportion with resin-acid-esters, in this way obtaining products that are soluble in oil and with a higher melting point than the resin-acid-ester. These represent mixtures in which their melting points show the arithmetical mean of the melting points of both original substances. In this case separation does not take place even when the heating is increased, while—by adding hardening condensation products or resols—it is even possible to separate the soluble parts, consisting of natural resins or their esters, by means of suitable solvents from the resit, e. g. the condensation product which has turned insoluble. If resols are used it is indispensable to start with acid-resins, as reaction takes place with these alone. In order to neutralize the so-treated acid-resins, these are subjected to a subsequent esterification process with glycerine or an alcohol suitable for this purpose.

The present invention on the contrary, is based on a process in which it is possible to harden resin-esters by treatment with formaldehyde-phenol or cresol-condensation products. This effect is obtained by adding to the hardenable condensation product an equal quantity of a condensation product of paraldehyde and phenol or cresol which is manufactured in the presence of an acid or alkaline catalyst, in order that the condensation produces resins which remain soluble and fusible. No separation of the condensation products of formaldehyde and phenol or cresol occurs, but a uniform chemical product which cannot be dissolved by continued heating in solvents. The melting point of resins hardened in this way can be fixed voluntarily by the amount of formaldehyde-phenol- or cresol-condensation product. Thus it is readily possible to produce absolutely neutral resins with melting points of 120° C. and far higher degrees.

The condensation-products of phenol or cresol and formaldehyde prepared with an alkaline catalyst may be substituted by phenoldialcohols produced by an alkaline reaction which is well known. The advantage of using phenoldialcohols as hardening elements is that the resin esters hardened in this way are extremely light and easily soluble. Using phenoldialcohol as hardening condensation product the quantities of the elements are the same as described already.

The proceeding can be done in closed vessels or in the open air or in an indifferent gas atmosphere or under pressure or in the vacuum. The invention may be illustrated by the following examples:

Example 1

100 parts of a phenol formaldehyde condensation product prepared on an alkaline base (resol) are melted with 100 parts of a condensation product of paraldehyde and cresol (novolak). The resol is obtained by reacting 10 kilos phenol and 4.5 kilos paraformaldehyde in the presence of about 20 ccm caustic soda (of 33% NaOH) the latter being a catalyst. The reaction is carried out at about 100° C. and the product is a highly viscous resin. The condensation product of paraldehyde and cresol is obtained by reacting 1000 ccm technical cresol, 400 ccm paraldehyde and 5 ccm hydrochloric acid the latter being a catalyst. The resin forms in the cold. The water that has formed and the hydrochloric acid that has been used as catalyst must first of all be removed from the mixture before mixing it with the above described resol. The melted mixture that is produced out of equal parts of these condensation products is added to 4½ times as much resin ester (colophony-glycerin-ester).

The homogeneous melted mixture is heated up to 150° C. and maintained at this temperature for several hours until the melting point of the thereby formed resin is raised to a constant value. The melting point of the resin ester is thus raised from 68° C. to 110° C. Instead of colophony-glycerin-ester, an ester may be used which is produced by heating 300 parts of colophony and 270 parts of cetylalcohol. In the same manner an ester made by heating 100 parts of colophony and 30 parts of phenol may be used.

Example 2

100 parts of phenol or cresol and an excess of formaldehyde condensation product prepared on an alkaline base are melted with 100 parts of a condensation product prepared from paraldehyde and phenol or cresol. 600 parts of resin ester (colophony-glycerin-ester) are then added to this molten mixture and the mass heated in the same way as described in Example 1. The melting point of the resin-ester is raised from 68° C. to 125° C.

*Example 3*

100 parts of phenoldialcohol and 100 parts of paraldehyde phenol condensating product are melted together. 800 parts of resin ester are added (colophony-glycerin-ester). This mass is heated for several hours, first at 150° C. and later the temperature is raised to 250° C. The heating is continued till the melting point is constant. The melting point of the resin-ester is raised in this case from 68° C. to 100° C.

*Example 4*

100 parts of the condensation product described in Example 1, (i. e. the mixture of equal parts of novolak and resol) are mixed with 500 parts of Manila copal-glycerin-ester. This melted mixture is heated for several hours at first to 150° till finally to about 250° C. The melting point remaining constant, the Manila copal-glycerin-ester is hardened, i. e. that the melting point is raised from 75° to 125° C.

I claim:

1. A new composition of matter comprising a resinous complex consisting of the reaction product produced by heating together (a) a heat hardening component selected from the group consisting of (1) a phenol formaldehyde condensate produced in the presence of a basic catalyst, and (2) a phenol dialcohol, (b) a permanently fusible and soluble component produced from a phenol and paraldehyde and (c) a natural resin acid ester component produced by esterifying the said resin acid with one of the group consisting of glycerine, cetyl alcohol and phenol, the said reaction product of said three components being soluble in linseed oil and having a melting point of at least 100° C.

2. A new composition of matter comprising a resinous complex consisting of the reaction product produced by heating together (a) a heat hardening component selected from the group consisting of (1) a phenol formaldehyde condensate produced in the presence of a basic catalyst, and (2) a phenol dialcohol, (b) a permanently fusible and soluble component produced from a phenol and paraldehyde and (c) a natural resin acid ester component produced by esterifying the said rosin with glycerine, the amount of said rosin ester component being from about three to five times the combined amount of the other two components, said reaction product of said three components being soluble in linseed oil and having a melting point of at least 100° C.

ERICH ASSER.